US009528289B2

(12) United States Patent
Gilbreath et al.

(10) Patent No.: US 9,528,289 B2
(45) Date of Patent: Dec. 27, 2016

(54) APPARATUS FOR SUPPORTING CABLE

(71) Applicant: Hubbell Incorporated, Shelton, CT (US)

(72) Inventors: Kyle Bradford Gilbreath, Atlanta, GA (US); Joseph Forrester, Auburn, GA (US); Joshua Charles Wilson, Moody, AL (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 14/827,395

(22) Filed: Aug. 17, 2015

(65) Prior Publication Data

US 2016/0047492 A1    Feb. 18, 2016

Related U.S. Application Data

(60) Provisional application No. 62/037,820, filed on Aug. 15, 2014.

(51) Int. Cl.
| | | |
|---|---|---|
| *E04H 12/00* | (2006.01) | |
| *G02B 6/44* | (2006.01) | |
| *G02B 6/48* | (2006.01) | |

(52) U.S. Cl.
CPC ............. *E04H 12/00* (2013.01); *G02B 6/483* (2013.01); *G02B 6/444* (2013.01); *G02B 6/4459* (2013.01)

(58) Field of Classification Search
CPC ............... F16L 3/06; F16L 3/26; E04H 12/00; G02B 6/483; G02B 6/4459
USPC ................. 52/173.1; 385/134–137
See application file for complete search history.

(56) References Cited

U.S. PATENT DOCUMENTS

| | | | | | |
|---|---|---|---|---|---|
| 2,935,550 | A | * | 5/1960 | Gunthel, Jr. | H01R 4/38 174/43 |
| 5,092,663 | A | * | 3/1992 | Hivner | G02B 6/4422 174/40 TD |
| 5,097,529 | A | | 3/1992 | Cobb et al. | |
| 5,109,467 | A | | 4/1992 | Hogan et al. | |
| 5,243,679 | A | * | 9/1993 | Sharrow | A61B 18/245 385/134 |
| 5,285,515 | A | * | 2/1994 | Milanowski | G02B 6/4453 385/135 |
| 5,375,185 | A | * | 12/1994 | Hermsen | G02B 6/4454 385/135 |
| 5,408,571 | A | * | 4/1995 | Kaplan | G02B 6/4422 385/135 |
| 5,689,605 | A | * | 11/1997 | Cobb | G02B 6/4454 385/135 |
| 5,696,864 | A | * | 12/1997 | Smith | G02B 6/4448 385/134 |
| 5,724,469 | A | | 3/1998 | Orlando | |
| 5,867,624 | A | * | 2/1999 | Forrester | G02B 6/483 385/100 |

(Continued)

OTHER PUBLICATIONS

PCT/US2015/045455 International Search Report and Written Opinion dated Nov. 24, 2015.

*Primary Examiner* — Brent W Herring
(74) *Attorney, Agent, or Firm* — Michael Best & Friedrich, LLP

(57) ABSTRACT

A cable supporting device includes a channel member. The channel member has a curved section bounding an interior. A top flange, a bottom flange, and an outer wall define a channel. The channel has an opening facing the interior.

19 Claims, 5 Drawing Sheets

(56) References Cited

U.S. PATENT DOCUMENTS

| | | | | |
|---|---|---|---|---|
| 5,966,492 A * | 10/1999 | Bechamps | ............ | G02B 6/4471 385/135 |
| 6,215,937 B1 * | 4/2001 | Dinh | .................... | G02B 6/4457 385/134 |
| 6,311,006 B1 * | 10/2001 | Forrester | ................ | G02B 6/483 174/70 R |
| 6,898,363 B2 * | 5/2005 | Forrester | ................ | G02B 6/483 385/100 |
| 6,930,244 B1 * | 8/2005 | Nebel | ................ | B60R 16/0207 174/486 |
| 7,085,468 B2 * | 8/2006 | Forrester | ................ | G02B 6/483 385/135 |
| 7,116,883 B2 * | 10/2006 | Kline | ................... | G02B 6/4457 385/135 |
| 7,236,681 B2 * | 6/2007 | Moheb | ............... | H01Q 13/0258 385/146 |
| 7,340,144 B2 | 3/2008 | Dobbins et al. | | |
| 7,346,253 B2 * | 3/2008 | Bloodworth | ......... | G02B 6/4453 385/134 |
| 7,356,237 B2 * | 4/2008 | Mullaney | ............. | G02B 6/4441 385/135 |
| 7,418,184 B1 * | 8/2008 | Gonzales | ............. | G02B 6/4471 385/134 |
| 7,477,829 B2 | 1/2009 | Kaplan | | |
| 7,580,607 B2 * | 8/2009 | Jones | .................... | G02B 6/483 385/134 |
| 7,822,310 B2 * | 10/2010 | Castonguay | ......... | G02B 6/4454 174/91 |
| 7,970,249 B2 * | 6/2011 | Solheid | ................ | G02B 6/4447 385/134 |
| 8,121,455 B2 * | 2/2012 | Mossner | ............. | G02B 6/4459 385/135 |
| 8,280,215 B2 * | 10/2012 | Hetzer | ................. | G02B 6/4442 385/135 |
| 8,374,477 B2 | 2/2013 | Hill | | |
| 8,385,711 B2 * | 2/2013 | Fabrykowski | ....... | G02B 6/4471 385/134 |
| 8,660,397 B2 * | 2/2014 | Giraud | ................. | G02B 6/4441 385/135 |
| 2004/0108426 A1 * | 6/2004 | Turvey | ............... | A47B 88/0407 248/223.41 |
| 2005/0145522 A1 | 7/2005 | Bloodworth et al. | | |
| 2005/0238311 A1 * | 10/2005 | Forrester | ................ | G02B 6/483 385/136 |
| 2006/0098930 A1 * | 5/2006 | Forrester | ................ | G02B 6/483 385/134 |
| 2006/0275010 A1 * | 12/2006 | Forrester | ................ | G02B 6/483 385/136 |
| 2007/0036506 A1 * | 2/2007 | Kewitsch | ............. | G02B 6/4457 385/135 |
| 2008/0199139 A1 * | 8/2008 | Henderson | ............. | H01R 13/72 385/135 |
| 2008/0205844 A1 * | 8/2008 | Castonguay | ......... | G02B 6/4454 385/135 |
| 2008/0230643 A1 * | 9/2008 | Ornskar | ............... | B65H 75/143 242/118.4 |
| 2010/0054680 A1 * | 3/2010 | Lochkovic | ............. | B65H 75/14 385/135 |
| 2013/0315550 A1 * | 11/2013 | James | .................. | G02B 6/4442 385/135 |
| 2014/0197261 A1 * | 7/2014 | Witherbee | .......... | B65H 75/4476 242/118.4 |
| 2015/0117829 A1 * | 4/2015 | Allen | ................... | G02B 6/4454 385/135 |
| 2015/0131957 A1 * | 5/2015 | Gilbreath | .................. | F16L 3/06 385/135 |
| 2016/0091684 A1 * | 3/2016 | Van Cauteren | ...... | G02B 6/4448 385/135 |

* cited by examiner

APPARATUS FOR SUPPORTING CABLE

FIELD

Various exemplary embodiments relate to storing cable, for example fiber optic cable and fiber optic drop wire along an aerial transmission route.

BACKGROUND

Modern telecommunication systems utilize a number of materials and mediums to transmit information. Recently, cables, such as fiber optic cables, have become more popular in the communication industry and have begun to replace electrical wires. Fiber optic cables include transparent optical fibers made of glass or plastic and are capable of transmitting voice, video, and data. Compared to electrical wires, fiber optic cables permit signals to travel longer distances with less loss and less electromagnetic interference.

One type of fiber optic cable used to transmit data across aerial transmission lines is all-dielectric self-supporting (ADSS) cables. Such cables typically have a strong nonmetallic sheath that supports the optical fibers making up the cable. ADSS cables may also have a reinforcing strand at its core. All-dielectric cable has the advantage that it can be used in close proximity to electrical power lines, whereas conventional communication cables are required to be run in a separate zone, usually at least forty inches below the power cables and above ground neutral. Other types of fiber optic cable lines include, encased with ground wire, encased within phase conductor, and wrapped around phase conductor or ground wire cables.

Fiber optic cable is typically installed on aerial transmission routes in long lengths so as to minimize the number of splices, each of which degrades optical signals and is expensive. Because of certain problems related with splicing, such as increased noise, it is generally more desirable to overbuild for the amount of cable and store the cable as opposed to splicing cable in the future. To allow for rerouting, due to pole movement and for repairs, slack is provided in the form of surplus lengths of cable at intervals along the route. With increased storage intervals, it is less probable that lengths of cable must be rehung if rerouting is necessary. Storing surplus cable poses problems as optical cable has a minimum bend radius and is vulnerable to damage (fiber breakage) from bending and twisting, if the minimum radius is exceed.

SUMMARY

According to an exemplary embodiment, a cable supporting device includes a channel member. The channel member has a curved section bounding an interior. A top flange, a bottom flange, and an outer wall define a channel. The channel has an opening facing the interior.

According to another exemplary embodiment, a cable supporting device includes a channel member. The channel member has a top flange, a bottom flange, and an outer wall defining an inward facing channel. The inward facing channel extends around a curved back section, a first side section, and a second side section.

According to another exemplary embodiment, a cable distribution system includes a plurality of poles and a cable extending along the plurality of poles. A cable supporting device includes a channel member having a top flange, a bottom flange, and an outer wall defining a channel. The channel extends around a curved back section, a first side section, and a second side section defining an interior of the cable support. The channel has an opening facing the interior. A surplus portion of the cable is positioned in the channel of the cable supporting device.

A further exemplary embodiment is directed to a method of supporting cable. A cable supporting device is attached to an overhead line extending along a plurality poles. The cable supporting device has a channel member with an inward facing channel and a curved back section. A loop of a cable is formed and at least a portion of the loop is positioned in the channel member.

BRIEF DESCRIPTION OF DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Figure 1:
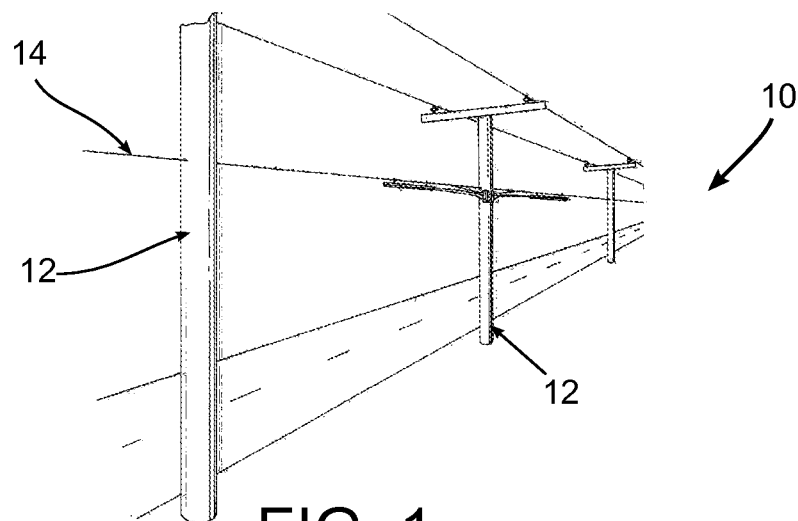
FIG. 1 is a perspective view of a transmission line according to an exemplary embodiment.
Figure 2:
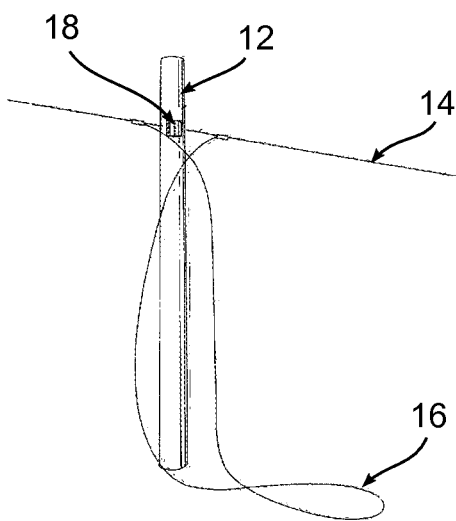
FIG. 2 is a perspective view of a transmission line and cable loop according to an exemplary embodiment.

FIG. 1 depicts an illustrative embodiment of an overhead transmission line 10 including a series of poles 12 inserted into the ground supporting standard power transmission lines and a fiber optic cable line 14. The poles 12 utilize different clamps and connectors for the power and fiber optic cable lines 14. One or more poles 12 include a surplus length or loop 16 of cable as depicted in FIG. 2. A cable guide 18 having one or more slots is attached to the pole 12 to assist in guiding and supporting the cable loop 16.

Figure 3:
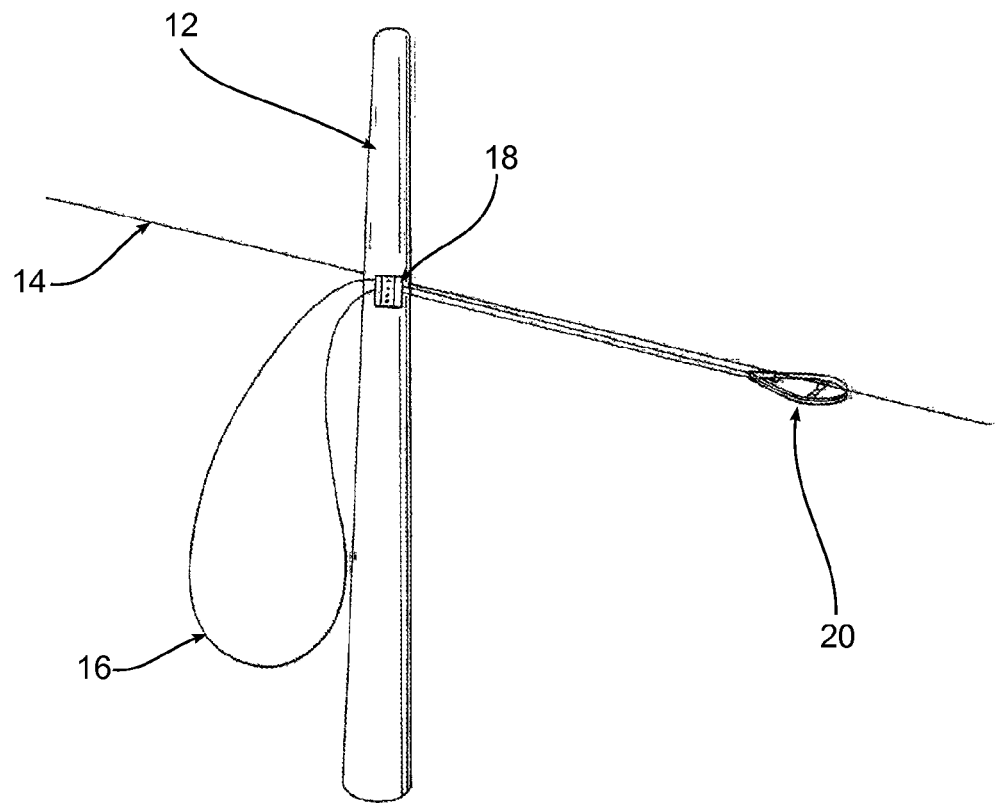
FIG. 3 is a perspective view of transmission line and cable loop with a cable support according to an exemplary embodiment.
Figure 4:
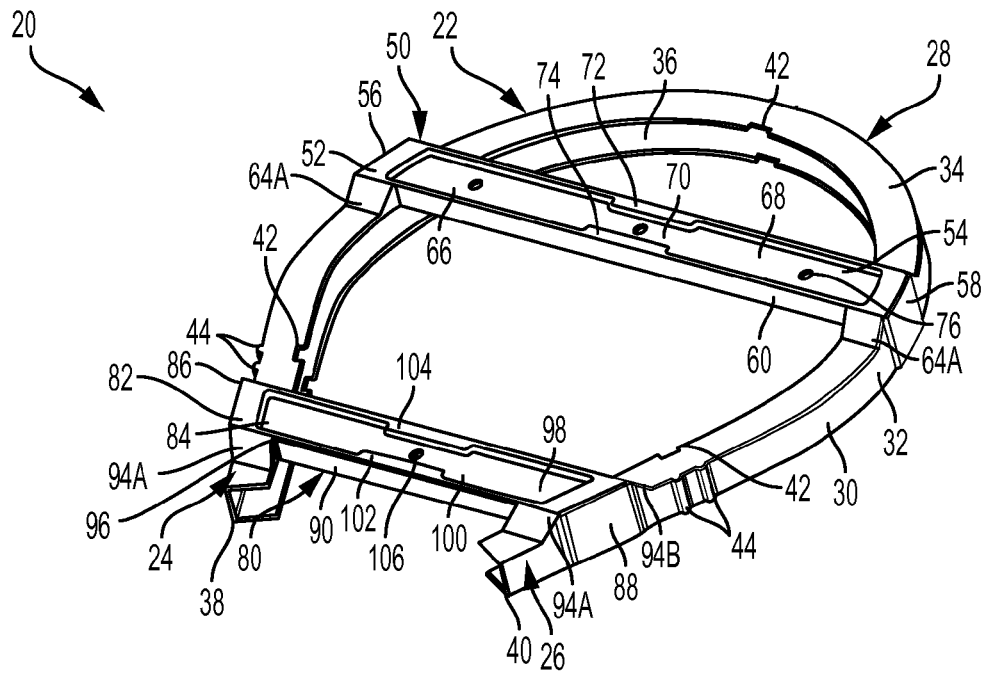
FIG. 4 is a top perspective view of a cable support according to an exemplary embodiment.
Figure 5:
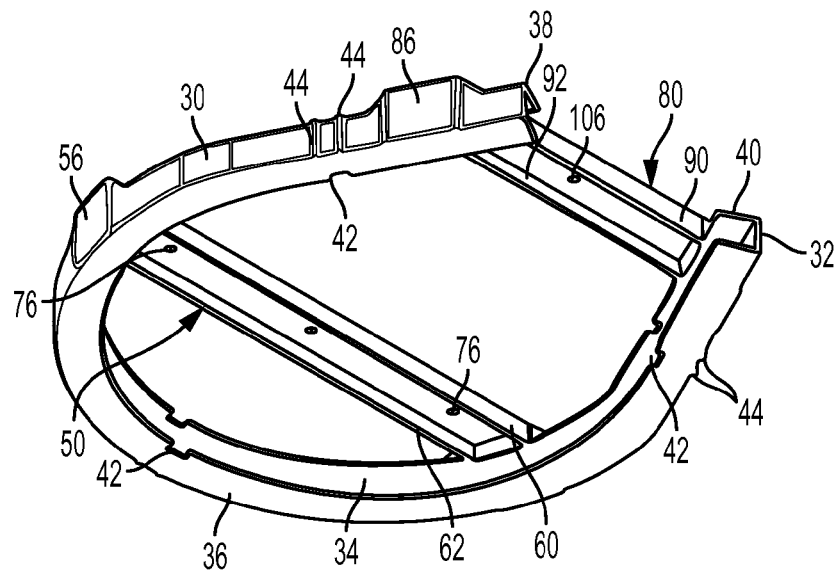
FIG. 5 is a bottom perspective view of the cable support of FIG. 4.
Figures 6, 7:
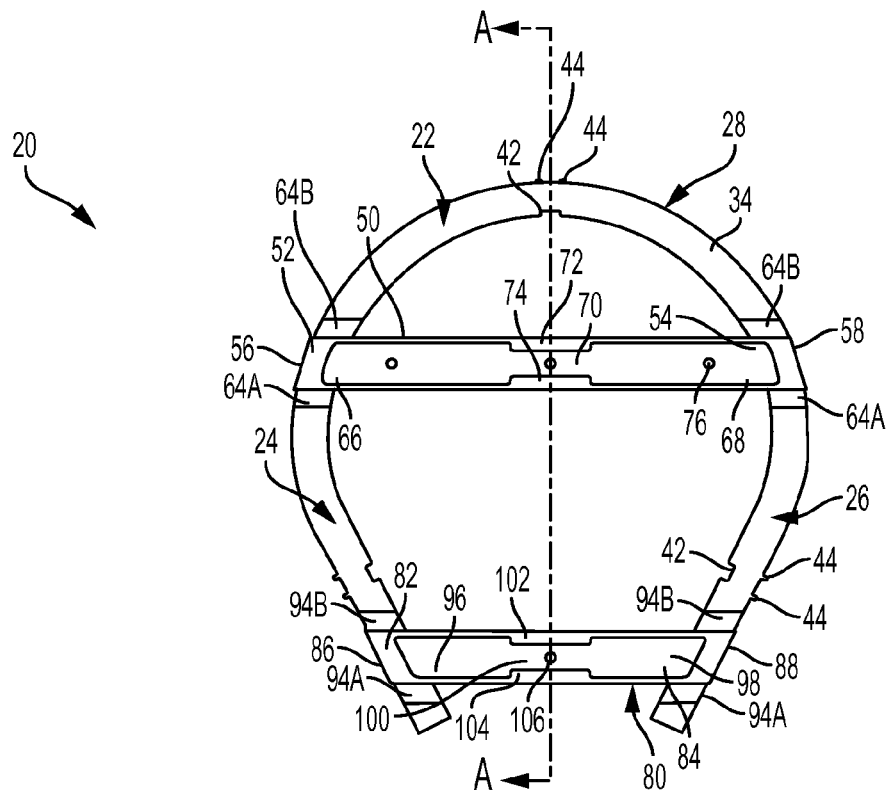
FIG. 6 is a top view of the cable support of FIG. 4.
FIG. 7 is a bottom view of the cable support of FIG. 4.
Figure 8:
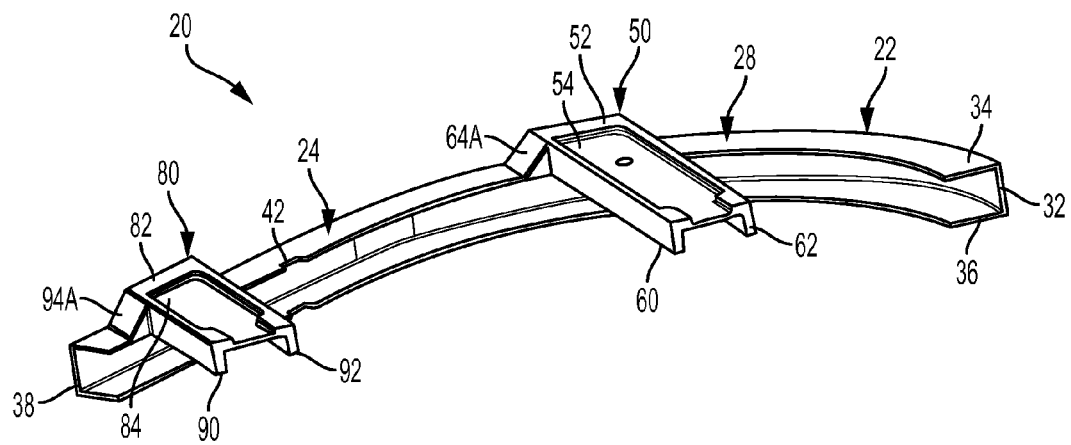
FIG. 8 is a top perspective, sectional view of the cable support taken along line A-A in FIG. 6.
Figure 9:
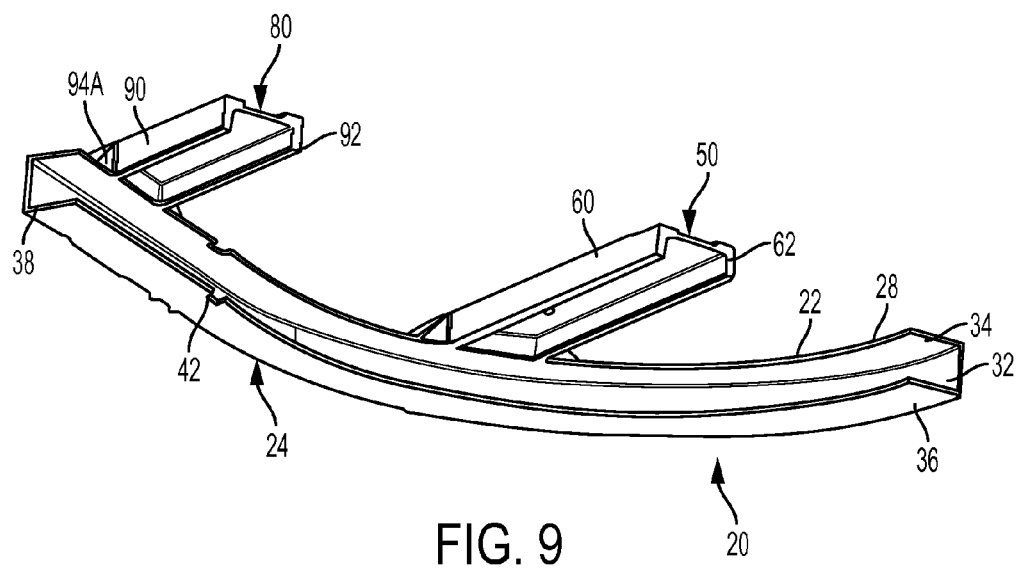
FIG. 9 is a bottom perspective, sectional view of the cable support taken along line A-A in FIG. 6.

Storage of surplus cable should include measures to prevent the cable from exceeding the manufacture's minimum bending limits under variable conditions. According to an exemplary embodiment, one or more cable supports 20 attach to the cable line 14 to support the ends of the loop 16 and prevent the ends from bending beyond the minimum limit. According to the illustrative embodiment shown in FIG. 3, two portions of the loop 16 are inserted into the cable guide 18 to separate the loop 16 into a first section and a second section. A first cable support 20 receives the first section of the loop 16 and is positioned on the line 14 so that the cable is taut or otherwise stretched to a required distance. A second cable support (not shown) receives the second section of the loop 16 and is positioned on the line 14 on the opposite side of the pole 12 so that the cable is taut or otherwise stretched to a required distance. The cable supports 20 may be attached to the line 14 by various mounting hardware, such as sleeves, clamps, and fasteners. The portions of the cable between the cable support 20 and the cable guide 18 can be secured to the line 14 using bands or tie wraps as needed.

FIGS. 4-9 depict an exemplary embodiment of a cable support 20. The cable support 20 includes channel member 22 having a curved portion that retains a section of the cable approximately at or above a minimum bend radius associated with the cable. In the exemplary embodiment, the cable support 20 has a substantially horseshoe-shaped channel member 22 having an open front, an angled first side section 24, an angled second side section 26, and a curved back section 28. First and second transitions 30 connect the first and second side sections 24, 26, respectively, to the back section 28. The channel member 22 includes an outer wall 32, a top flange 34, a bottom flange 36, a first open end 38, and a second open end 40. The top and bottom flanges 34, 36 extend from the outer wall towards the interior of the cable support 20 to create an inward facing channel.

The inward facing channel provides at least one advantage over a cable support having an outward or upward facing channel. For example, cables stored in the cable support will have a tendency to bow outward or upward, potentially displacing the cables from the channel and the support. An inwardly facing channel resists this movement and helps to retain the cables.

According to an exemplary embodiment, the channel member 22 has one or more slots 42 positioned in the top and bottom flanges 34, 36. The exemplary embodiment includes three slots 42 with one positioned on the first side section 24, one positioned on the second side section 26, and one positioned on the back section 28. A pair of ribs 44 extends from the outer wall 32 opposite each slot 42. The slots 42 and ribs 44 can be used to retain bands or tie wraps wrapped around the channel member 22 as needed.

According to a further exemplary embodiment, a first cross brace 50 extends outward from the top flange 34 and at least partially across the back section 28 of the cable support 20. The first cross brace 50 includes a top surface 52, a depression 54, a first end 56, a second end 58, a first sidewall 60, and a second sidewall 62. First and second angled shoulders 64A, 64B extend from the top flange 34 to the top surface 52 at the first end 56 and the second end 58. The first and second ends 56, 58 are curved to match the profile of the curved back section 28, although other shapes and configurations may be used. The depression 54 is spaced below the top surface 52 and includes first and second outer sections 66, 68 connected by a narrowed middle section 70. The top surface 52 includes a first tab 72 and a second tab 74 extending towards the center of the first cross brace 50 that bounds the narrow middle section 70. The depression 54 includes one or more openings 76. The openings 76 and the depression 54 are configured to receive mounting components (not shown), for example mounting brackets and fasteners, to connect the cable support 20 to the cable line 14.

According to an exemplary embodiment, a second cross brace 80 extends outward from the top flange 34 from the first side section 24 to the second side section 26. The second cross brace 80 includes a top surface 82, a depression 84, first and second ends 86, 88, and first and second side walls 90, 92. First and second angled shoulders 94A, 94B extend from the top flange 34 to the top surface 84 at the first end 86 and the second end 88. The first and second ends 86, 88 are angled to match the profile of the first and second side sections 24, 26, although other shapes and configurations may be used. The depression 84 is spaced below the top surface 82 and includes first and second outer sections 96, 98 connected by a narrowed middle section 100. The top surface 82 includes a first tab 102 and a second tab 104 extending towards the center of the second cross brace 80 to narrow the middle section 100. The depression 84 includes one or more openings 106. The openings 106 and the depression 84 are configured to receive mounting components (not shown), for example mounting brackets and fasteners, to connect the cable support 20 to the cable line 14.

In various alternative embodiments, the size, shape, and configuration of the cable support 20 varies. For example, the cable support 20 may have a closed configuration with a curved front and back. Other alternative embodiments can utilize fewer, or more than, two cross braces 50, 80 and the position of the cross braces 50, 80 may be varied from what is shown in the exemplary embodiments of FIGS. 4-9.

The cable support 20 can be made from a plastic, metal, ceramic, or composite material, or any combination thereof. In various exemplary embodiments, the cable support 20 is made from an injection molded plastic, or any other stiff, lightweight material.

The cable support 20 can be a unitary structure or it can be formed from separate connected pieces. For example, the first and second cross braces 50, 80 may be formed separately and welded to the channel member 22.

Certain applications and additional components that can be used according to the described embodiments although not shown would be understood by one of ordinary skill in the art when viewing this disclosure. For example, U.S. Pat. No. 7,085,468, which is hereby incorporated by reference in its entirety to show additional exemplary components, but is not meant to affect or limit the scope of the claims of this application. The foregoing detailed description of the certain exemplary embodiments has been provided for the purpose of explaining various principles and practical applications, thereby enabling others skilled in the art to understand that other various embodiments and modifications are suited to the particular use contemplated. This description is not necessarily intended to be exhaustive or to limit the invention to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upward," "downward," "outward," and other orientational descriptors are intended to facilitate the description of the exemplary embodiments of the present invention, and are not intended to limit the structure of the exemplary embodiments of the present invention to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:
1. A cable supporting device comprising:
   a cable support configured to connect to an overhead cable distribution system including, a channel member having a curved section bounding an interior, a top flange, a bottom flange, and an outer wall defining a channel with an opening facing the interior, and a first cross brace extending across the channel member from a first end to a second end, the first cross brace having a top surface with a depression, wherein the depression includes a first outer section, a second outer section, and a narrowed middle section.

2. The cable supporting device of claim 1, wherein the channel member includes a curved back section, a first angled side section, and a second angled side section.

3. The cable supporting device of claim 2, wherein the first cross brace extends across the back section of the channel.

4. The cable supporting device of claim 3, further comprising a second cross brace extending from a first end at the first side section to a second end at the second side section.

5. The cable supporting device of claim 1, wherein the channel member includes a first open end and a second open end.

6. The cable supporting device of claim 1, wherein the channel member includes a first slot in the top flange and a second slot in the bottom flange aligned with the first slot.

7. The cable supporting device of claim 6, further comprising a pair of ribs extending from the outer wall opposite the first and second slots.

8. The cable supporting device of claim 1, wherein the cross brace includes a first tab and a second tab positioned opposite the first tab at least partially defining the narrowed middle section.

9. The cable supporting device of claim 1, wherein the depression includes an opening.

10. The cable supporting device of claim 1, wherein the cable support is suspended from a line.

11. A cable supporting device comprising:
a cable support configured to connect to an overhead cable distribution system, the cable support including,
a channel member having a top flange, a bottom flange, and an outer wall defining an inward facing channel extending around a curved back section, a first side section, and a second side section, and
a first cross brace extending across the channel member from a first end to a second end, the first cross brace having a top surface with a depression, wherein the depression includes a first outer section, a second outer section, and a narrowed middle section.

12. The cable supporting device of claim 11, wherein the channel member includes a first pair of slots in the first side section, a second pair of slots in the second side section and a third pair of slots in the back section.

13. The cable supporting device of claim 11, wherein the back section extends along a bend radius.

14. The cable supporting device of claim 13, wherein the bend radius is greater than or approximately equal to the minimum bend radius of a fiber optic cable.

15. The cable supporting device of claim 11, wherein the cross brace extends across the back section of the channel and the narrowed middle section is at least partially defined by a first tab and a second tab positioned opposite the first tab.

16. The cable supporting device of claim 15, further comprising a first shoulder extending from the top flange to a top surface of the first brace.

17. The cable supporting device of claim 11, wherein the cable support is suspended from a line.

18. An overhead cable distribution system comprising:
a plurality of poles;
a cable extending along the plurality of poles;
a cable supporting device connected to an overhead portion of the cable distribution system including a channel member having a top flange, a bottom flange, and an outer wall defining a channel extending around a curved back section, a first side section, and a second side section defining an interior of the cable support, wherein the channel has an opening facing the interior, and wherein a first cross brace extends across the channel member from a first end to a second end, the first cross brace having a top surface with a depression, wherein the depression includes a first outer section, a second outer section, and a narrowed middle section; and
a surplus portion of the cable positioned in the channel of the cable supporting device.

19. The cable distribution system of claim 18, wherein the cable supporting device is suspended from a line.

* * * * *